(12) United States Patent
Alling et al.

(10) Patent No.: US 7,337,934 B2
(45) Date of Patent: Mar. 4, 2008

(54) GRIPPING DEVICE

(75) Inventors: Jon Alling, Schaumburg, IL (US); Mike Pelland, Medinah, IL (US); Greg Aper, Chicago, IL (US); Brendan Doorhy, Westmont, IL (US)

(73) Assignee: Kolpin Outdoors, Inc., Fox Lake, WI (US)

( * ) Notice: Subject to any disclaimer, the term of this patent is extended or adjusted under 35 U.S.C. 154(b) by 556 days.

(21) Appl. No.: 10/827,608

(22) Filed: Apr. 19, 2004

(65) Prior Publication Data

US 2005/0230444 A1    Oct. 20, 2005

(51) Int. Cl.
*B62J 7/00* (2006.01)
*B62J 9/00* (2006.01)
*B60R 11/00* (2006.01)

(52) U.S. Cl. .................. 224/401; 224/440; 224/443; 224/446; 224/448; 224/454; 224/451; 224/456; 224/461; 224/536

(58) Field of Classification Search ............... 224/401, 224/440, 442, 443, 446, 448, 451, 454, 456, 224/459, 461, 462, 536, 558, 570, 926; 294/104, 294/16
See application file for complete search history.

(56) References Cited

U.S. PATENT DOCUMENTS

| | | | |
|---|---|---|---|
| 558,567 A | 4/1896 | Ross | |
| 575,018 A | 1/1897 | Wentworth | |
| 612,908 A | 10/1898 | Meehan | |
| 661,677 A | 11/1900 | Taylor | |
| 702,292 A | 6/1902 | Edmonds | |
| 1,563,255 A | 11/1925 | Couch | |
| 2,125,214 A * | 7/1938 | Apfel et al. | 294/11 |
| 2,722,727 A * | 11/1955 | Scheifele | 403/374.2 |
| 2,740,210 A | 4/1956 | Hamborg | |
| 3,177,029 A | 4/1965 | Larson | |
| 3,649,062 A | 3/1972 | Young, Jr. | |
| 4,377,305 A | 3/1983 | Horvath | |
| 4,433,829 A * | 2/1984 | Grover et al. | 254/131 |
| 4,478,451 A | 10/1984 | Brucher et al. | |
| 4,607,772 A | 8/1986 | Hancock | |
| 4,607,873 A | 8/1986 | Nusbaumer et al. | |
| D304,656 S | 11/1989 | Hancock | |
| 4,965,958 A * | 10/1990 | Cedergreen et al. | 43/55 |
| 5,078,279 A | 1/1992 | Hancock et al. | |
| 5,192,104 A * | 3/1993 | Lin | 294/19.1 |
| 5,236,298 A | 8/1993 | Lehman | |
| 5,312,081 A * | 5/1994 | Martin | 248/316.3 |
| 5,354,110 A * | 10/1994 | Licata | 294/11 |
| 5,622,341 A * | 4/1997 | Stana | 248/74.1 |
| D386,304 S | 11/1997 | Hancock | |
| 5,898,975 A | 5/1999 | Hancock | |
| 5,915,572 A | 6/1999 | Hancock | |
| 5,938,259 A * | 8/1999 | Sawdon et al. | 294/116 |
| 6,457,618 B1 | 10/2002 | Hancock et al. | |

(Continued)

*Primary Examiner*—Nathan J. Newhouse
*Assistant Examiner*—Lester L. Vanterpool
(74) *Attorney, Agent, or Firm*—Brian G. Gilpin; Godfrey & Kahn, S.C.

(57) ABSTRACT

A gripping device having a body with at least one moveable arm. The moveable arm may be selectably positionable and secured at a position by a locking pin. The gripping device may have a body selectably attached to a base having a release. Actuating the release allows the body to be removed from the base. A gripping surface on an arm may have an engagement surface and a plurality of air pockets positioned below the engagement surface.

4 Claims, 12 Drawing Sheets

U.S. PATENT DOCUMENTS

| | | |
|---|---|---|
| 6,484,913 B1 | 11/2002 | Hancock et al. |
| D476,290 S | 6/2003 | Gates et al. |
| 6,964,442 B1 * | 11/2005 | Radcliff ................ 294/17 |
| 2003/0168484 A1 | 9/2003 | Gates et al. |
| 2003/0173388 A1 | 9/2003 | Hancock et al. |
| 2003/0201634 A1 | 10/2003 | Kramer |
| 2004/0113041 A1 | 6/2004 | Hancock et al. |
| 2004/0116979 A1 * | 6/2004 | Truckai et al. ................ 607/51 |

* cited by examiner

GRIPPING DEVICE

BACKGROUND OF THE INVENTION

This invention relates generally to a gripping device, and in particular, to a gripping device for use in connection with securing items to a vehicle.

People have used various devices to grip and hold articles. Many of these devices are used to secure articles to a vehicle, such as a car, truck, or all-terrain vehicle (ATV). These devices allow articles to be securely attached to a vehicle while permitting the operator of the vehicle to focus on driving.

Specifically, devices have been used to secure sporting equipment and tools to vehicles. Such devices include rifle racks and rack systems. These rack systems generally have a U-shaped body. The equipment is placed into the U-shaped body. The body, however, generally has a predetermined shape. The shape may be configured so as to securely hold a specific article such as a rifle. Alternatively, the shape may be configured so as to hold many different types of articles. Both designs have certain limitations. The first rack system may be able to securely hold one type of article, but it can only be used with that type of article. The second rack system may be able to hold a variety of articles, but will not be able to securely or effectively hold any article.

An improvement on this general concept is disclosed in U.S. Pat. No. 5,915,572 to Hancock. This patent discloses a device having a generally U-shaped body. A plurality of fins are positioned on the body so as to engage an article placed into the body. The fins provide an improved gripping function than a U-shaped body alone. However, the body itself has a predetermined configuration thus limiting the articles which it can securely hold.

Another concept used to grip articles is disclosed in U.S. Pat. No. 5,938,259 to Sawdon et al. This patent discloses a gripping device having a pair of pivoting arms. The arms pivot towards and away from each other. The arms are functionally connected by a series of gears so that movement of one arm results in movement of the other arm the same distance and direction. The arms have a flat gripping surface. While this device can accommodate a greater variety of articles than devices having a fixed body, this device cannot securely hold articles having round or oddly shaped cross sections in its gripping surface.

Accordingly, a need exists for an improved gripping device that solves these and other deficiencies in the prior art. Of course, the present invention may be used in a multitude of situations where similar performance capabilities are required.

SUMMARY OF THE INVENTION

The present invention provides a gripping device that is cost-effective to manufacture, has relatively few parts, functionally secures items to a vehicle, and overcomes certain of the deficiencies in the prior art.

The present invention provides for a gripping device having a body with at least one moveable arm. In one embodiment, the body has a left side with a non-moveable arm, a right side with a non-moveable arm, and a moveable arm sandwiched between the left side and the right side. The moveable arm may be selectably positionable with respect to the non-moveable arms. The gripping device may also have a locking pin that selectably engages the moveable arm, thereby securing the moveable arm at a position. In an alternative embodiment, more than one arm may be moveable so as to secure items.

A gripping device in accordance with the present invention may also include a body selectably attached to a base. The base has a platform with a release. Actuating the release allows the body to be removed from the base.

A gripping device in accordance with the present invention may also provide for a gripping surface. The gripping surface has an engagement surface and a plurality of air pockets positioned below the engagement surface. Forcing the engagement surface against an article, or vice-versa, compacts the air pockets and provides for an improved grip.

While one possible application of the present invention is in connection with vehicles and in particular ATVs, many other applications are possible and references to use in connection with a vehicle should not be deemed to limit the uses of the present invention. The terms "arm," "body," "base," "left side," "right side," "locking pin," "gripping surface," "engagement surface," "tooth," "projection," "extension," "platform," or "air pocket" as used herein should not be interpreted as being limited to specific forms, shapes, numbers, or compositions of an arm, body, base, left side, right side, locking pin, gripping surface, engagement surface, tooth, projection, extension, platform, or air pocket. Rather, the arm(s), body, base, left side, right side, locking pin, gripping surface, engagement surface, tooth, projection, extension, platform, and air pocket may have a wide variety of shapes and forms, may be provided in a wide variety of numbers, and may be composed of a wide variety of materials. These and other objects and advantages of the present invention will become apparent from the detailed description, claims, and accompanying drawings.

DETAILED DESCRIPTION OF THE PREFERRED EMBODIMENTS

Figure 1:
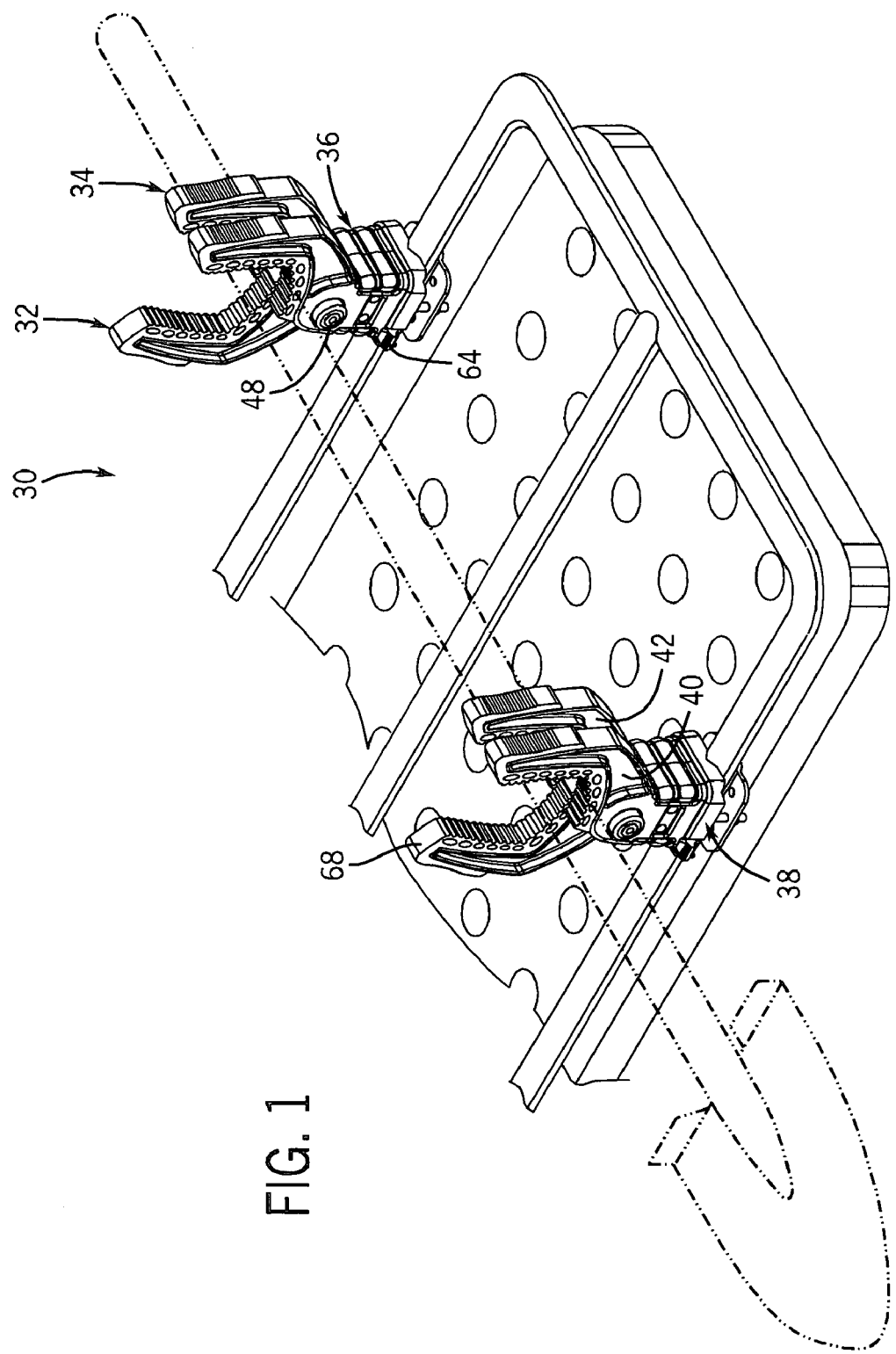
FIG. 1 is a perspective view of gripping devices in accordance with one embodiment of the present invention, shown attached to a vehicle rack with a tool placed in the gripping device illustrated in phantom.

Illustrative embodiments of a gripping device (identified generally as 30) in accordance with the present invention are shown in FIGS. 1 through 15. While the invention may be susceptible to embodiment in different forms, there are shown in the drawings, and herein are described in detail, certain illustrative embodiments with the understanding that the present disclosure is to be considered an exemplification of the principles of the invention, and is not intended to limit the invention to those as illustrated and described herein. Additionally, features illustrated and described with respect to one embodiment could be used in connection with other embodiments.

Figure 3:
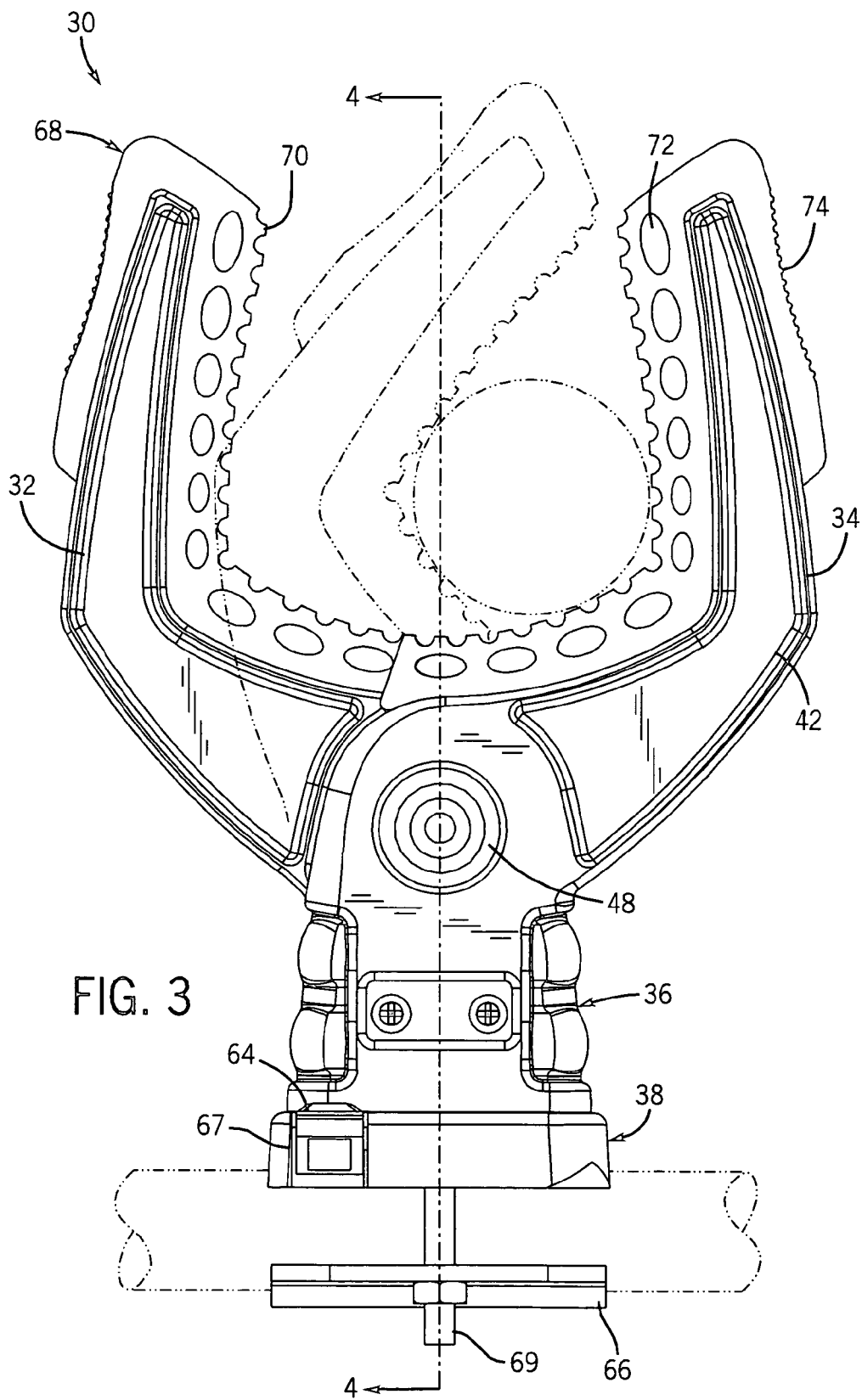
FIG. 3 is a side view of the gripping device of FIG. 2, with a secured positioning of the gripping device and item to be gripped illustrated in phantom.
Figure 13:
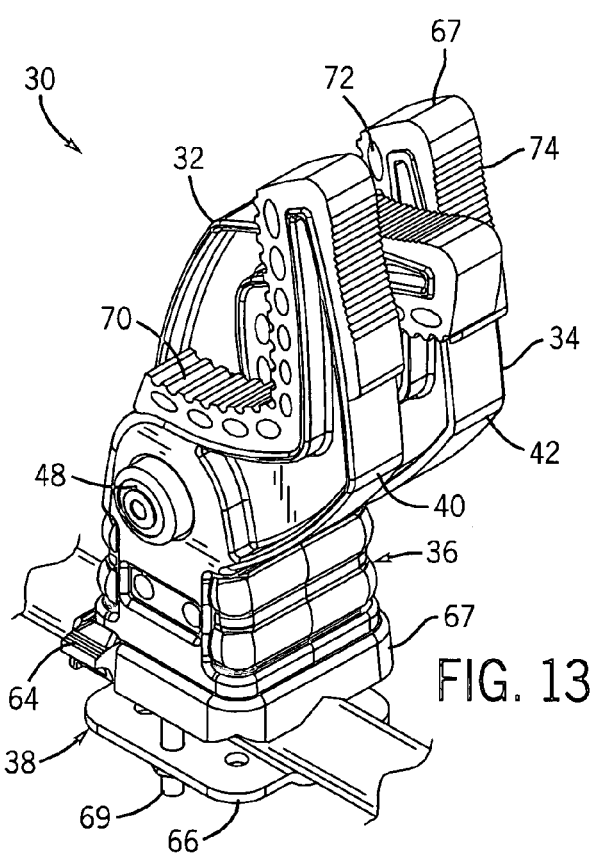
FIG. 13 is a perspective view of a gripping device in accordance with one embodiment of the present invention, shown mounted to a bar and in a closed position.

A gripping device 30 has a plurality of arms 32, 34 attached to a body 36. At least one of the arms 32 is moveable with respect to the body 36, thereby allowing the gripping device 30 to securely hold different articles. The moveable arm 32 may be moved between a variety of positions, as shown in FIGS. 3 and 13. The gripping device 30 may have a variety of features such as a locking pin 48, overmolded gripping surface 68, or contoured arms 32, 34 to improve its ability to hold different articles, including articles with a round or oddly shaped cross section.

Figure 14:
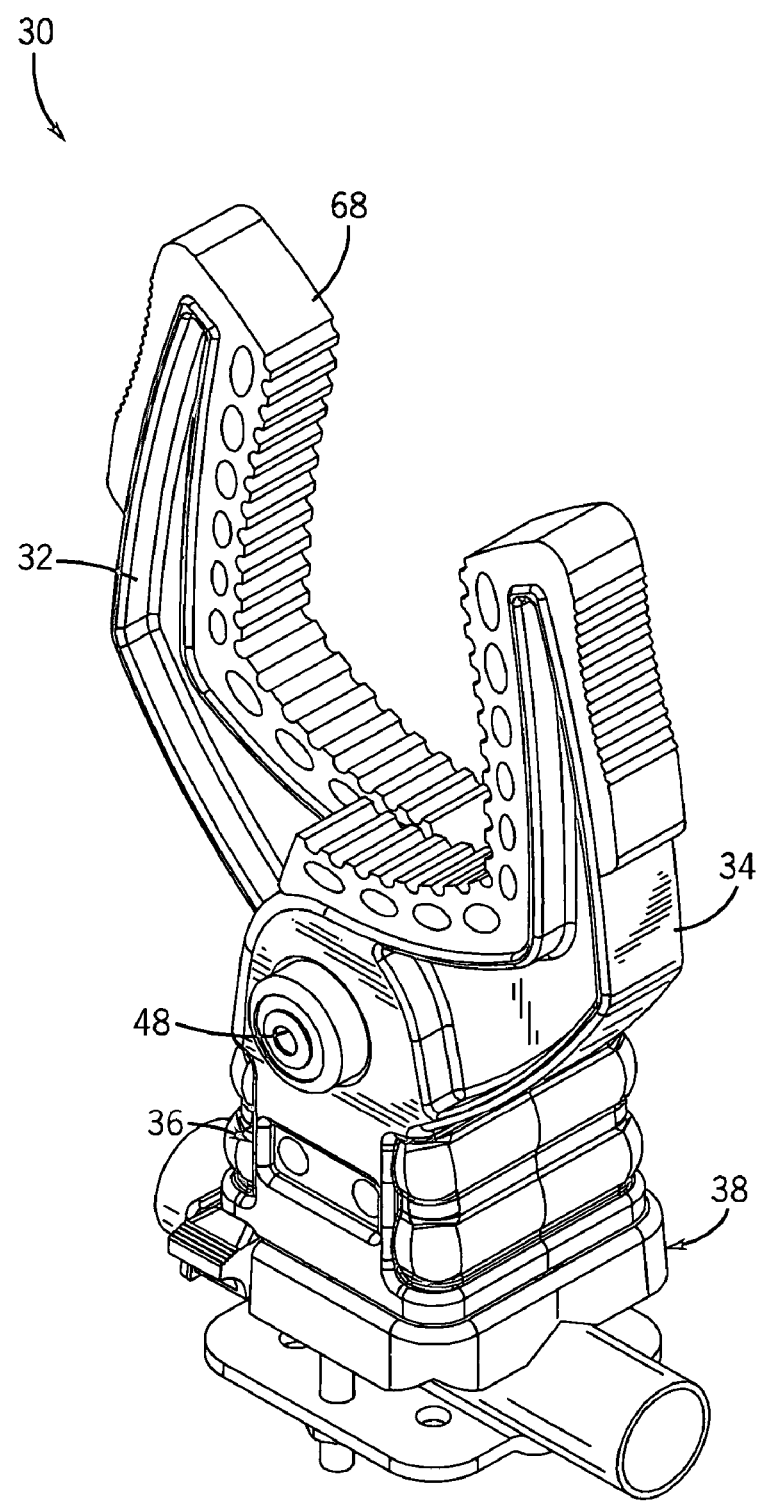
FIG. 14 is a perspective view of a gripping device in accordance with one embodiment of the present invention, shown mounted to a bar; and, FIG. 15 is a perspective view of a gripping device in accordance with one embodiment of the present invention, shown mounted to a bar.
Figure 15:
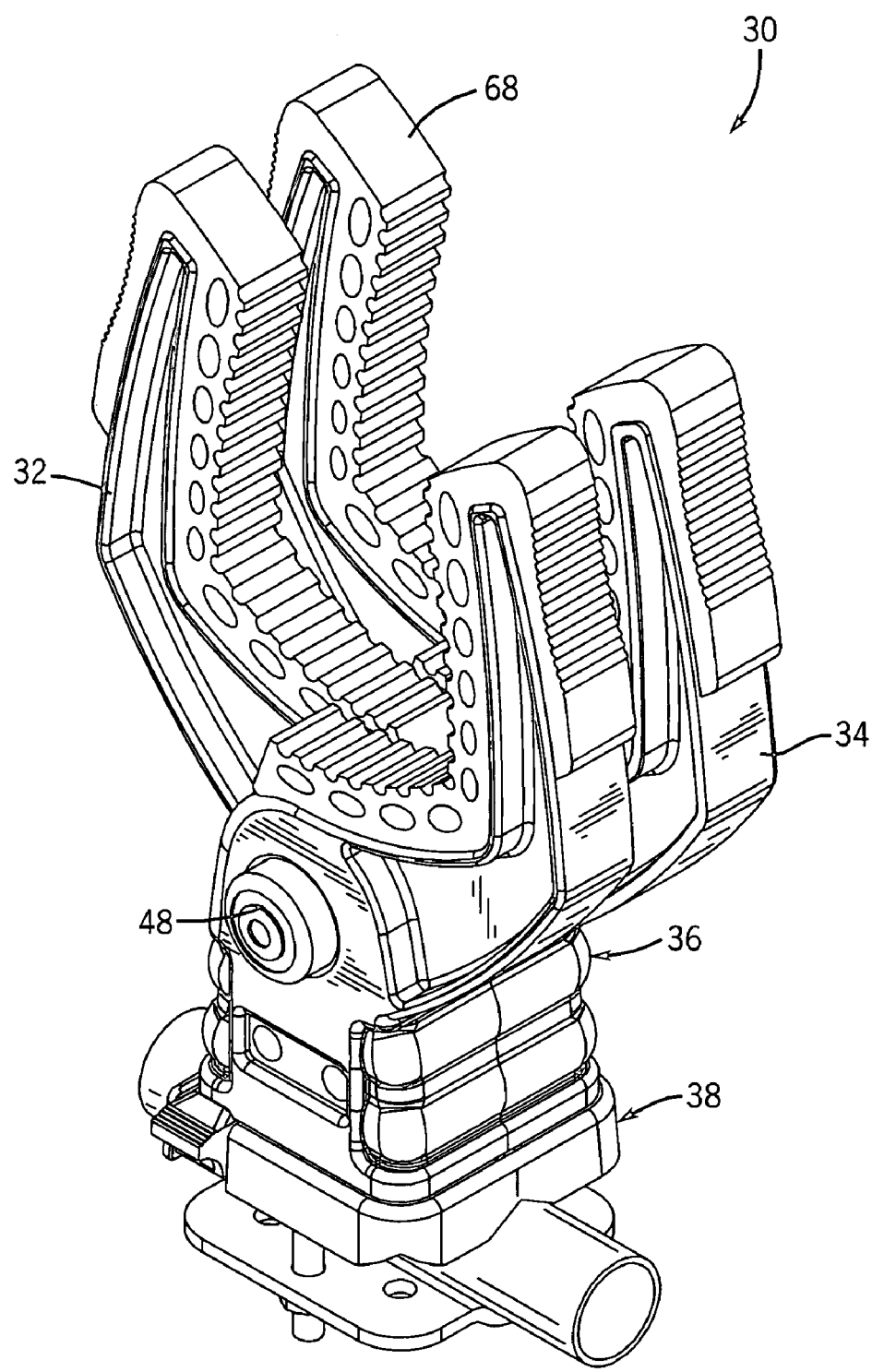

As shown in FIG. 1, the gripping device 30 has a body 36. The body 36 has a plurality of arms 32, 34. As shown in FIG. 1, the body 36 preferably has three arms 32, 34. Other numbers of arm may be used. For example as shown in FIGS. 14 and 15, the body 36 may have two or four arms 32, 34 respectively. At least one of the arms 32 is moveable with respect to the body 36. In the embodiment shown in FIGS. 1 and 2, the body 36 of the gripping device 30 has a left side 40 and a right side 42. At least one side 40, 42, and preferably both sides 40, 42, have an arm 34, and preferably a non-moveable arm 34. A moveable arm 32 is sandwiched between the left side 40 and the right side 42. The left side 40 and rights side 42 are attached to one another via fasteners, snap fit, or by other suitable methods. As shown in FIGS. 2, 7, 8, 10, and 11, the right side 42 has an interior 44 with extensions 46. The moveable arm 32 has an opening 47. The opening 47 of moveable arm 32 is configured to slide onto the outer diameter of locking pin 48. The opening 47 is also configured so as to allow the moveable arm 32 to move, and preferably pivot, with respect to the nonmoveable arms 34. Of course, the left side 40 and rights side 42 may be reversed in configuration or orientation without departing from the present invention. Similarly, other configurations of moveable and nonmoveable arms may be used without departing from the invention.

As shown in FIGS. 2, 7, 10, and 11, the moveable arm 32 may be spring biased, either towards or away from the non-moveable arm 34. In one embodiment, a coil spring 52 is attached to the moveable arm 32, preferably to a flange 51 surrounding the opening 47 and wound around and the opening 47 of the moveable arm 32. The coil spring 52 is also attached to either the left side 40 or the right side 42 of the body 36. In this embodiment, the moveable arm 32 is spring biased towards the non-moveable arm 34.

Figure 2:
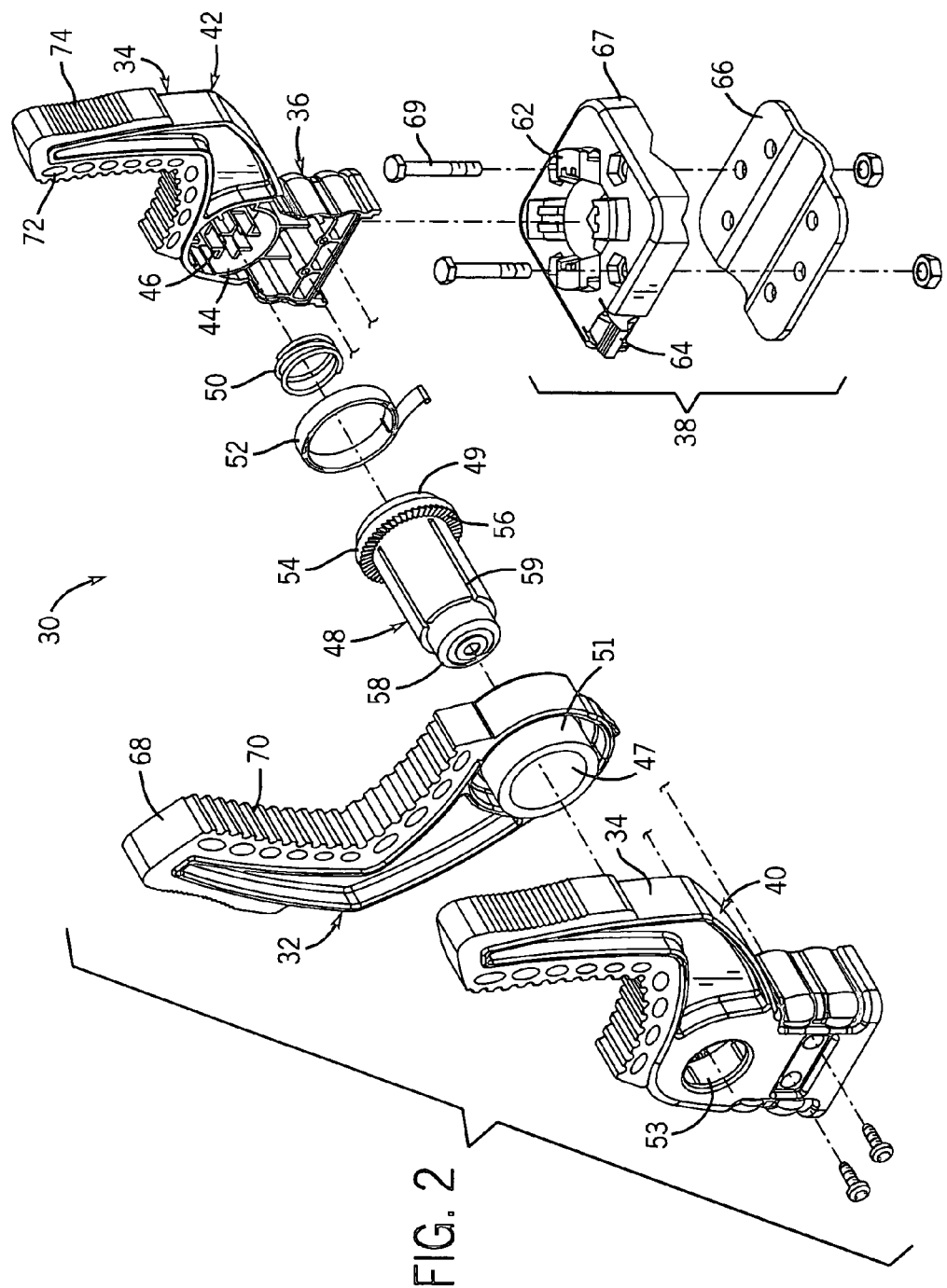
FIG. 2 is an exploded view of a gripping device in accordance with one embodiment of the present invention.
Figure 9:
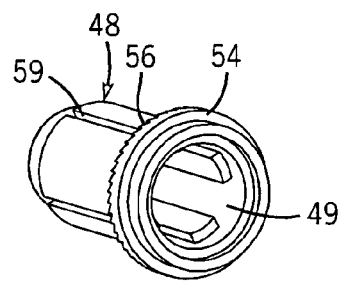
FIG. 9 is a perspective view of a locking pin of the gripping device of FIG. 2.
Figure 12:
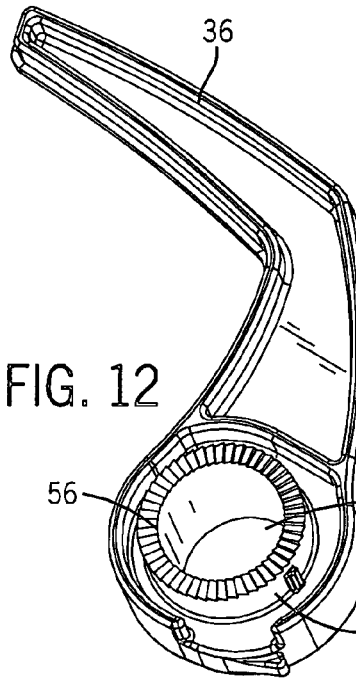
FIG. 12 is a perspective view of an arm of the gripping device of FIG. 2.

In the embodiment shown in FIGS. 2, 7, 8, 10, and 11, the gripping device 30 has a locking pin 48. The locking pin 48 allows the moveable arm 32 to be secured at a desired position. As shown in FIGS. 2 and 9, the locking pin 48 has also has an opening 49 that is configured to slide onto the extensions 46 of the interior 44 of the right side 42 of the body 36. A spring 50 may be positioned between the locking pin 48 and the right side 42 of the body 36. In this embodiment, the opening 47 of the moveable arm 32 is configured to slide onto the locking pin 48. As shown in FIGS. 4, 5, 10, and 11, the locking pin 48 has a head 54 with at least one tooth 56 and preferably a plurality of teeth 56. The flange 51 of surrounding the opening 47 of the moveable arm 32 also has at least one tooth 60 and preferably a plurality of teeth 60 that compliment the teeth 56 of the head 54 of the locking pin 48. The opening 47 of the moveable arm 32 is configured to slide onto the locking pin 48 so that the teeth 56 of the locking pin 48 selectably engage the teeth 60 of the moveable arm 32.

Figure 4:
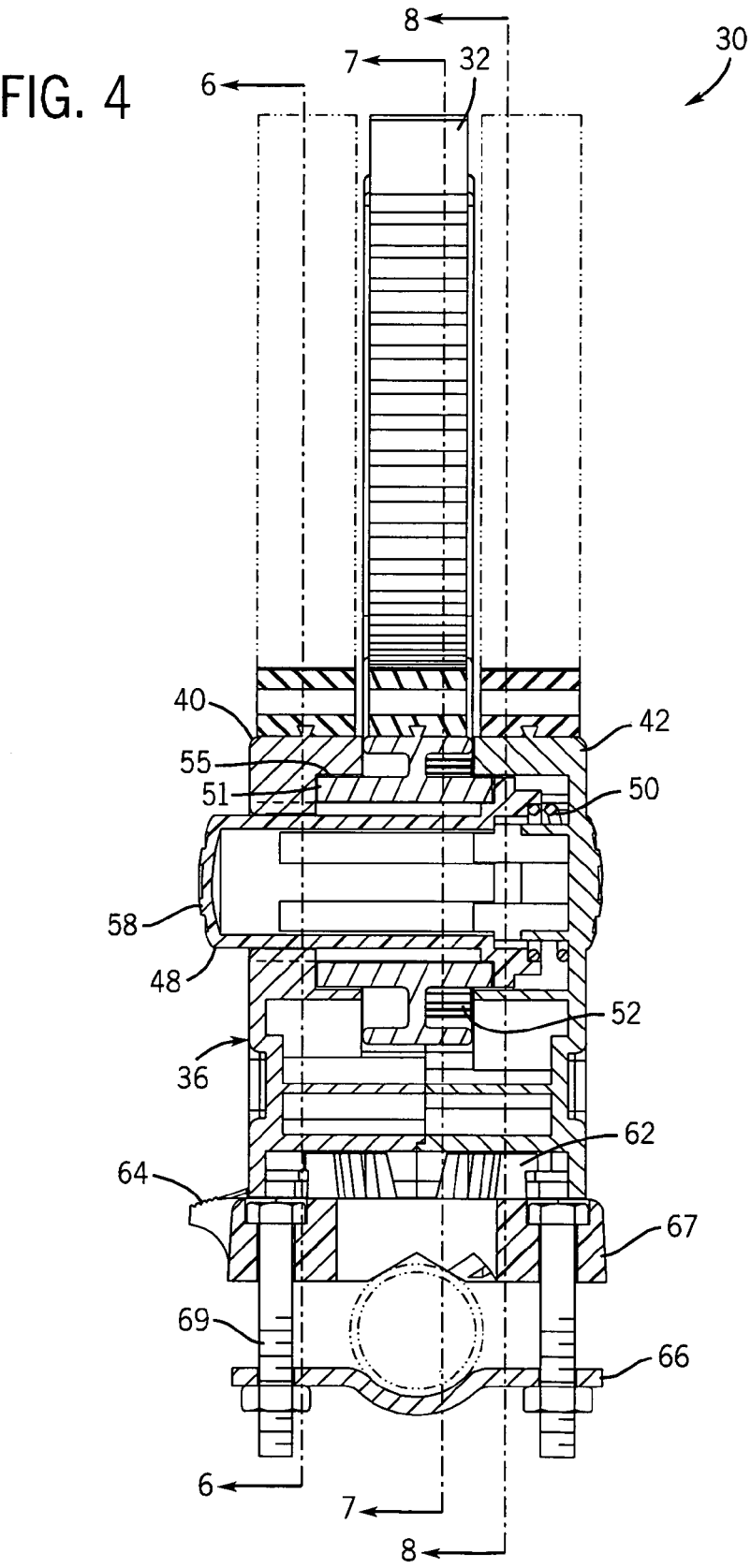
FIG. 4 is a cross-sectional view of the gripping device of FIG. 2 taken along the plane 4-4 in FIG. 3.
Figure 5:
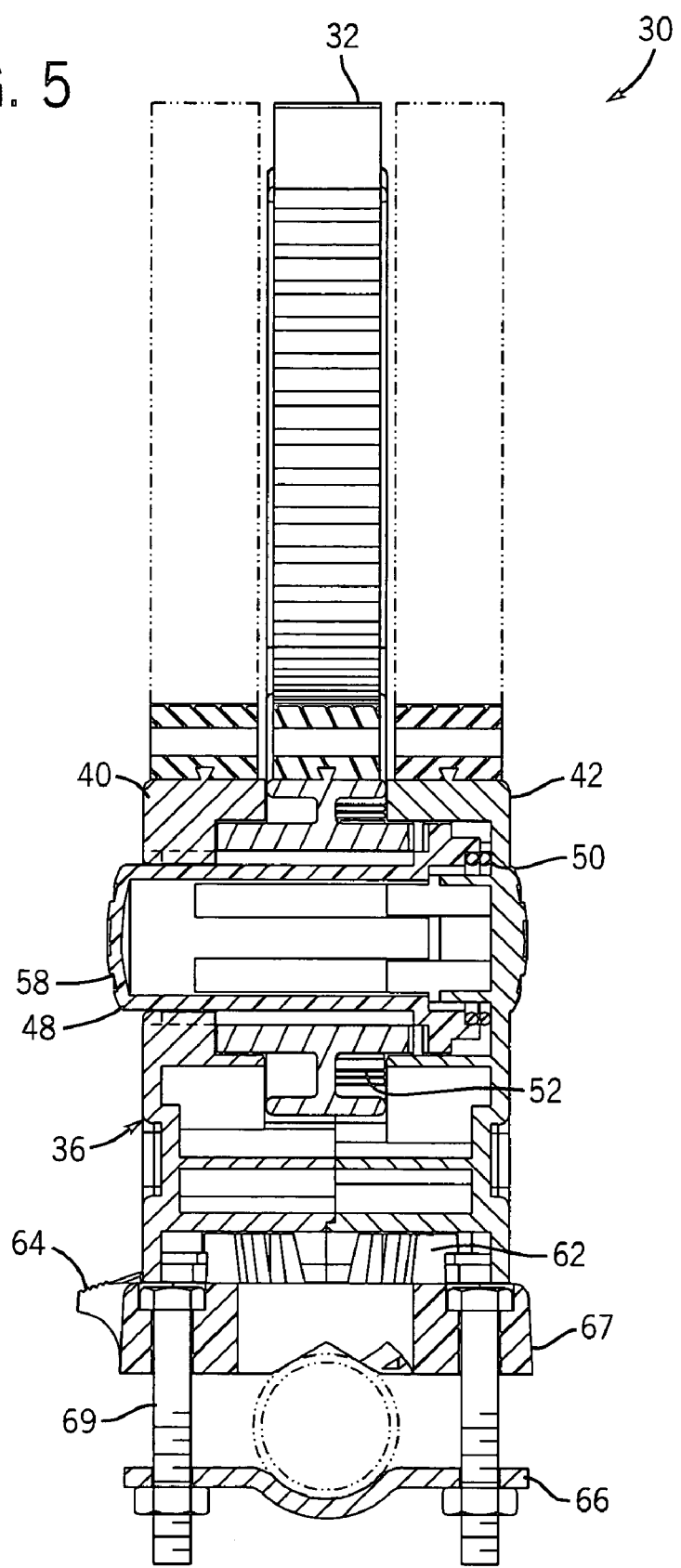
FIG. 5 is a cross-sectional view of the gripping device of FIG. 2 taken along the plane 4-4 in FIG. 3.
Figure 10:
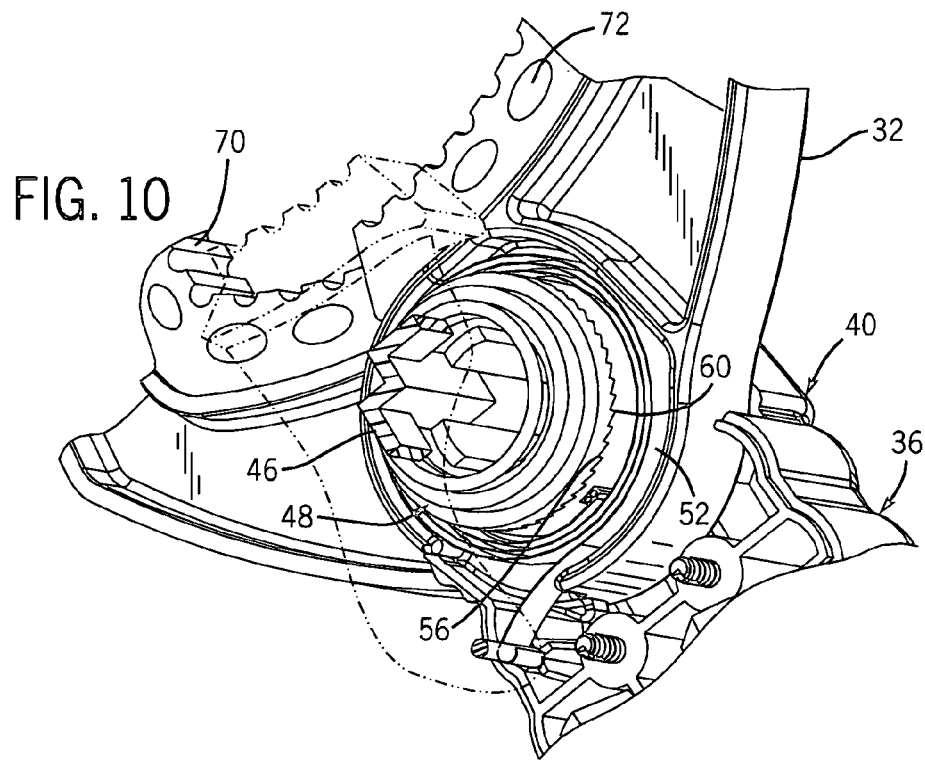
FIG. 10 is a partial cross-sectional view of the gripping device of FIG. 2, with an arm of the gripping device shown in phantom, where the gripping device is in a locked position.
Figure 11:
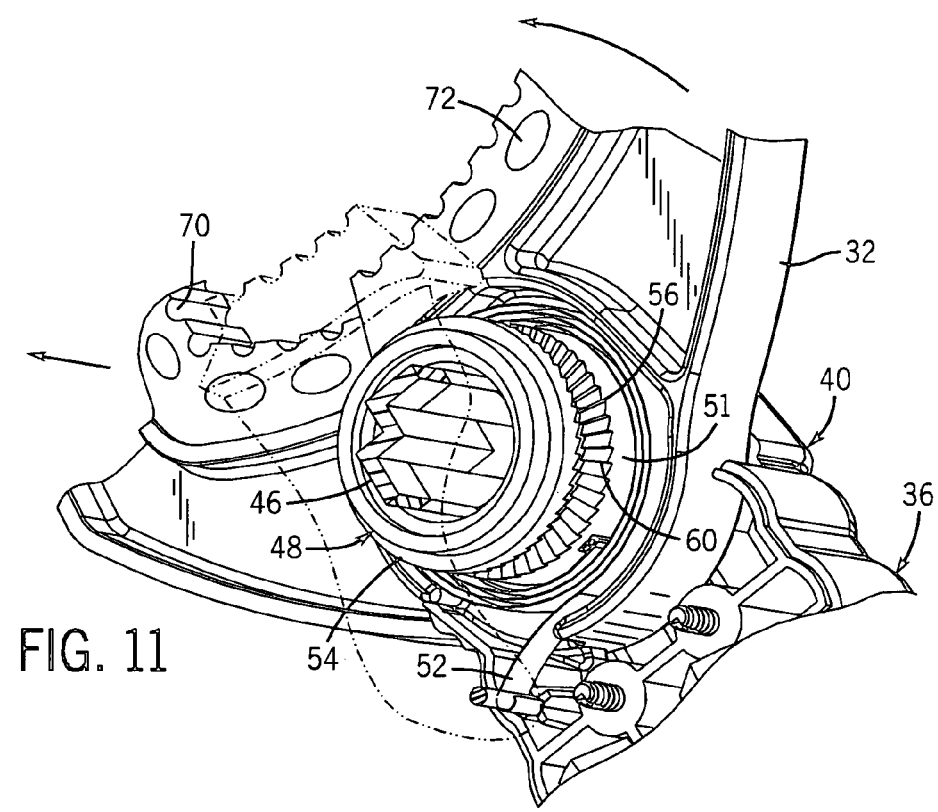
FIG. 11 is a partial cross-sectional view of the gripping device of FIG. 2, with an arm of the gripping device shown in phantom, where the gripping device is in an unlocked position.

As previously discussed, the moveable arm 32 may be sandwiched between the left side 40 and the right side 42 of the body 36. The left side 40 has an opening 53. The opening 53 of the left side 40 is configured to allow the locking pin 48 to extend therethrough. A face 58 of the locking pin 48 may extend beyond the left side 40. As discussed above and shown in FIGS. 2, 4, 5, 10, and 11, a spring 50 may be positioned between the locking pin 48 and the right side 42. As such, the locking pin 48 may be moved by exerting a force against the face 58. As shown in FIGS. 5 and 11, depressing the locking pin 48 moves the teeth 56 of the locking pin 48 out of engagement with the teeth 60 of the moveable arm 32 and compresses the spring 50. The moveable arm 32 may now be selectably positioned, as indicated by the arrows in FIG. 11 and shown in FIGS. 3 and 13. As shown in FIG. 4 and FIG. 10, releasing the locking pin 48 allows the spring 50 to expand. The locking pin 48 is forced away from the right side 42 of the body 36, thereby causing the teeth 56 of the locking pin 48 to engage with the teeth 60 of the moveable arm 32 and locking the moveable arm 32 in position.

Figure 6:
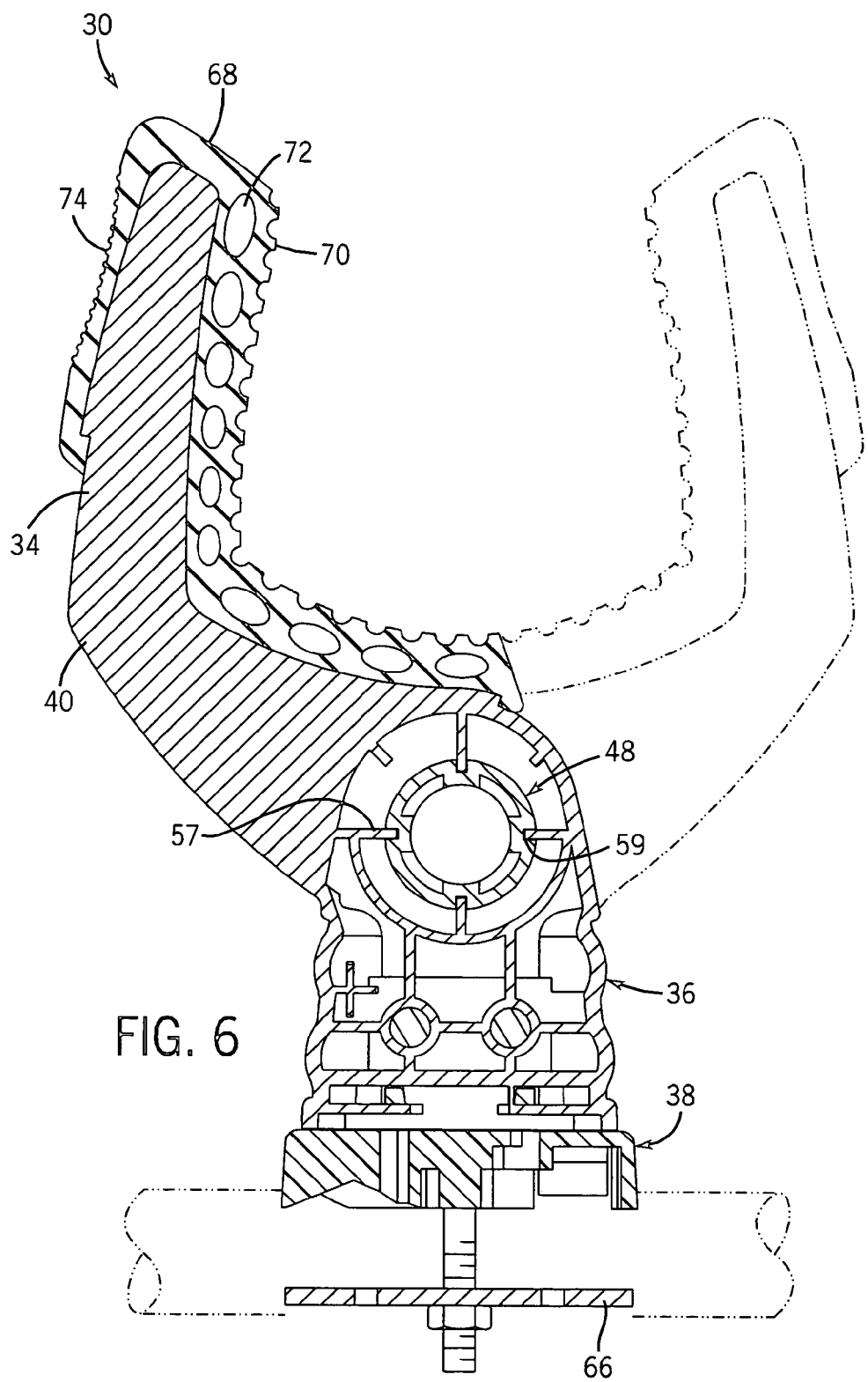
FIG. 6 is a partial cross-sectional view of the gripping device of FIG. 2 taken along the plane 6-6 in FIG. 4.
Figure 7:
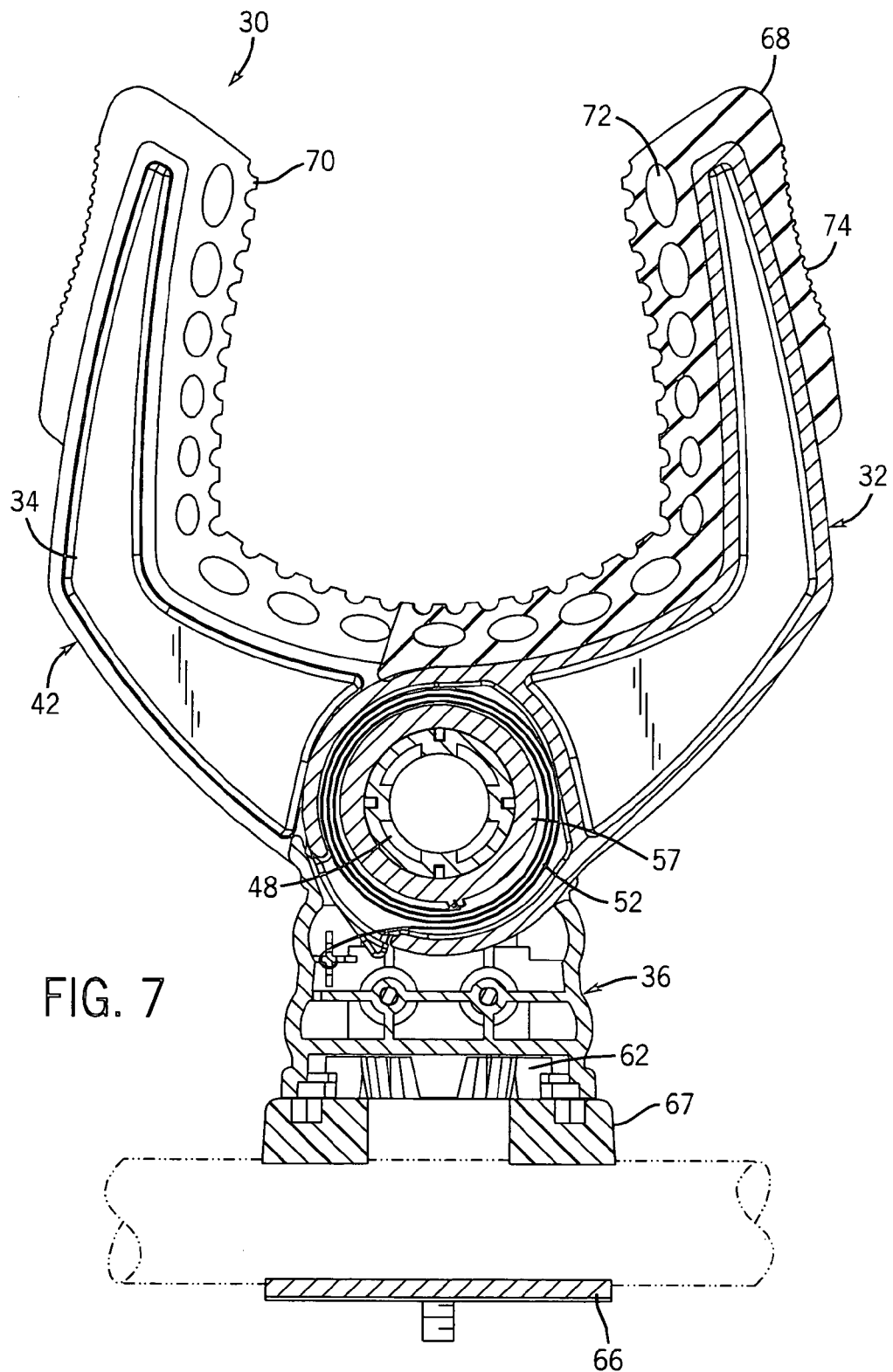
FIG. 7 is a partial cross-sectional view of the gripping device of FIG. 2 taken along the plane 7-7 in FIG. 4.
Figure 8:
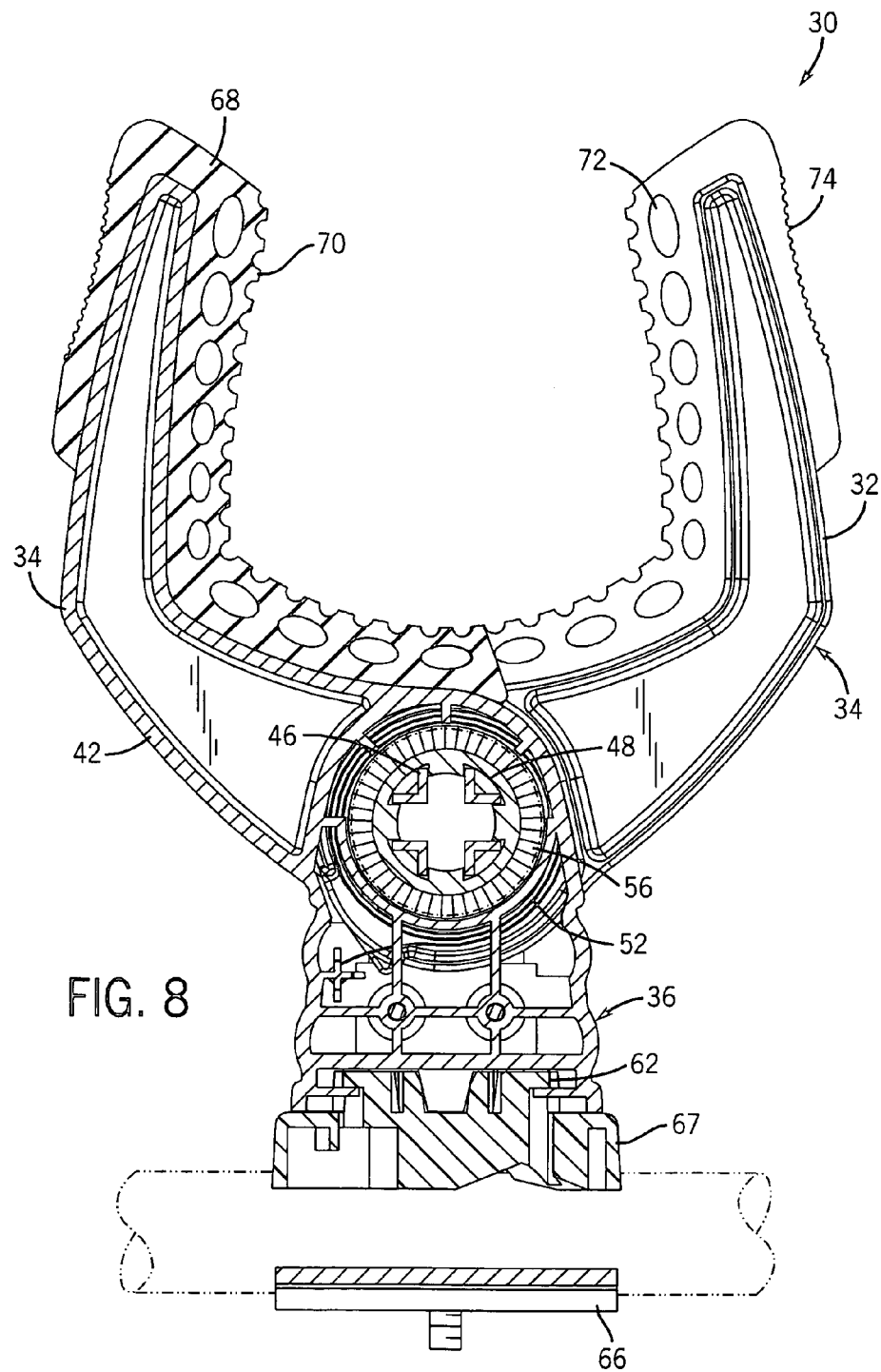
FIG. 8 is a partial cross-sectional view of the gripping device of FIG. 2 taken along the plane 8-8 in FIG. 4.

As shown in FIG. 4, the opening 53 of the left side 40 also has a flange 55. The flange 55 of the opening 53 of the left side 40 of the body 36 engages the flange 51 surrounding the opening 47 of the moveable arm 32, thereby securing the moveable arm 32 in the body 36. In one embodiment as shown in FIG. 6, the flange 55 has at least one projection 57 that fits into a groove 59 in the locking pin 48.

The arms 32, 34 may be contoured in any shape. In the embodiment shown in FIGS. 1-13, the arms 32 and 34 are shaped somewhat like fingers. The arms 32, 34 may be configured with additional features to increase the functionality of the gripping device 30. As shown in FIGS. 1, 2, and 13, the arms 32, 34 may be covered with a gripping surface 68. The gripping surface 68 may have an engagement surface 70. The engagement surface 70 provides increased surface area of contact between the gripping device 30 and an article to be held therein. This increased surface area may be provided through the use of bumps, ridges, teeth or other suitable structures. Alternatively, the fins disclosed in U.S. Pat. No. 5,915,572 to Hancock, which is hereby incorporated in its entirety by reference for all purposes, may be used. The gripping surface 68 may also have a plurality of air pockets 72. As shown in FIGS. 2, 3, and 6-9, the air pockets 72 are positioned below the engagement surface 70. Forcing the engagement surface 70 against an article, or vice-versa, compacts the air pockets 72 and provides for an improved grip. The air pockets 72 provide areas of compression so that the arms 32, 34 may be closed tightly around an article. The gripping surface 68 may also have texture section 74 opposite the engagement surface 70. The texture sections 74 provide contoured areas for grasping by a user. The gripping surface 68 may be formed as part of the arms 32, 34 or may be an additional structure. In one embodiment, the gripping surface 68 is molded directly over the arms 32, 34 and does not require the use of any adhesive for attachment thereto.

In the embodiment shown in FIGS. 1, 2, and 13, the body 36 of the gripping device 30 is attached to a base 38. The base 38 secures the gripping device 30 to a suitable surface, such as the tubing commonly found around a rack of an ATV. The base 38 accomplishes this securing through the use of an anchor 66, a platform 67, and at least one fastener 69. The anchor 66 is positioned on one side of a suitable surface and the platform 67 is positioned on the other side. The anchor 66 and the platform 67 are connected via at least one fastener 69. The anchor 66 and/or platform 67 may have a series of holes through which the fasteners 69 may be inserted, thus providing many different attachment configurations. The anchor 66 and the platform 67 may be configured to securely fit around and sandwich any shaped material. Other attachment means could be used for securing the gripping device 30 to a suitable surface.

As shown in FIGS. 1 and 13, the body 36 is attached to the base 38. Preferably, the body 36 is attached to the platform 67 of the base 38. In one embodiment shown in FIG. 2, the platform 67 has at least one and preferably a plurality of projections 62. The body 36 is configured to securely engage the projections 62. The body 36 is slid onto the projections 62 and rotated, preferably 45°, thereby securing the body 36 to the base 38. As shown in FIGS. 2 and 13, the base 38, and preferably the platform 67, has a release 64. Pushing the release 64 deforms the projections 62, thus allowing the body 36 to be rotated and removed from the base 38.

In operation, a single or multiple gripping devices 30 are attached to a suitable surface as described above. The number of gripping devices 30 employed depends on a variety of factors such as the size and weight of an article to be gripped, the type of surface and vehicle the gripping device(s) 30 are attached to, and the degree of security an article is to be gripped. The locking pin 48 is depressed and the moveable arm 32 is pivoted away from the non-moveable arms 34. The locking pin 48 may be released, thereby securing the moveable arm 32 at a position. An article, such as sporting equipment or a tool, is positioned between the moveable arm 32 and the non-moveable arms 34. The locking pin 48 is depressed again, releasing the moveable arm 32. In one embodiment, the moveable arm 32, as a result of being spring biased, moves towards the non-moveable arms 34 and contacts the article. A user may tighten the arms 32, 34 around the article by applying a force to the moveable arm 32, preferably by squeezing the moveable arm 32 towards the non-moveable arms 34 and most preferably by squeezing the textured surface 79 of the gripping surface 68. Such squeezing may compress the air pockets 72 in the gripping surface 68. The locking pin 48 is released, thereby securing the moveable arm 32 at a position.

In one embodiment, the gripping device 30 can be operated in a ratcheting action. The moveable arm 32 can be moved toward the non-moveable arm 34 without depressing the locking pin 48. The moveable arm 32 cannot be moved away from the non-moveable arm 34 without depressing the locking pin 48. The orientation of the teeth 60 of the moveable arm 32 and the teeth 56 of the locking pin 48 allow movement of the moveable arm 32 in one direction, but not the other.

The gripping device of the present invention may have other applications aside from use in connection with vehicles and items secured thereto and the invention may be implemented in a variety of configurations, using certain features or aspects of the several embodiments described herein and others known in the art. Thus, although the invention has been herein shown and described in what is perceived to be the most practical and preferred embodiments, it is to be understood that the invention is not intended to be limited to the specific features and embodiments set forth above. Rather, it is recognized that modifications may be made by one of skill in the art of the invention without departing from the spirit or intent of the invention and, therefore, the invention is to be taken as including all reasonable equivalents to the subject matter of the claims.

We claim:

1. A gripping device comprising:
   a body having a left side with an opening and a non-moveable arm, a right side with a non-moveable arm and an interior with extensions, and a selectably positionable moveable arm with an opening, where the moveable arm is sandwiched between the left side and the right side;
   a gripping surface attached to at least one arm, where the gripping surface has an engagement surface and a plurality of air pockets positioned below the engagement surface, where the air pockets may be compressed when the engagement surface is forced against an article;
   a locking pin, wherein the locking pin slides onto the extensions of the right side of the body and extends through the opening of the moveable arm and the opening of the left side of the body such that the locking pin engages the moveable arm and can retain the moveable arm at a position; and
   a base having a platform with a release, where the base selectively attaches the body to a surface and actuating the release allows the body to be removed from the base.

2. The gripping device of claim 1 where the platform has at least one projection and the body is configured to selectably mate with the projection, wherein actuating the release deforms the projections, allowing the body to be rotated and removed from the base.

3. A gripping device comprising:
   a body having a left side with an opening and a non-moveable arm, a right side with a non-moveable arm and an interior with extensions, and a selectably positionable moveable arm with an opening, where the moveable arm is sandwiched between the left side and the right side;
   a gripping surface attached to at least one arm, where the gripping surface has an engagement surface and a plurality of air pockets positioned below the engagement surface, where the air pockets may be compressed when the engagement surface is forced against an article;

a locking pin, wherein the locking pin slides onto the extensions of the right side of the body and extends through the opening of the moveable arm and the opening of the left side of the body such that the locking pin engages the moveable arm and can retain the moveable arm at a position; and where the locking pin has at least one tooth and the moveable arm has at least one tooth such that the at least one tooth of the locking pin is selectable engageable to at least one tooth of the moveable arm.

4. The gripping device of claim 3 where the locking pin is spring biased such that depressing the locking pin allows the moveable arm to be moved.

* * * * *